United States Patent Office 3,327,957
Patented June 27, 1967

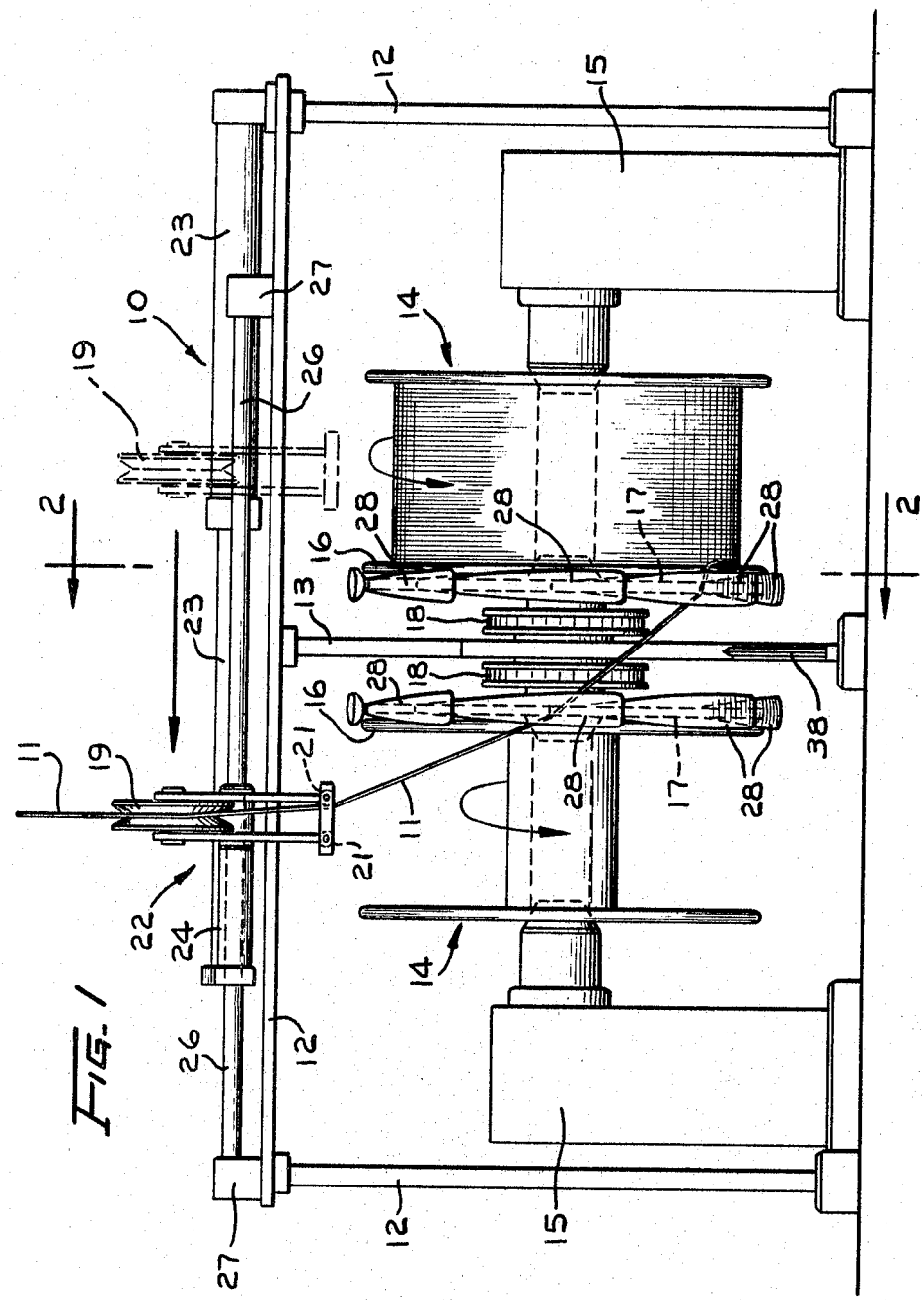

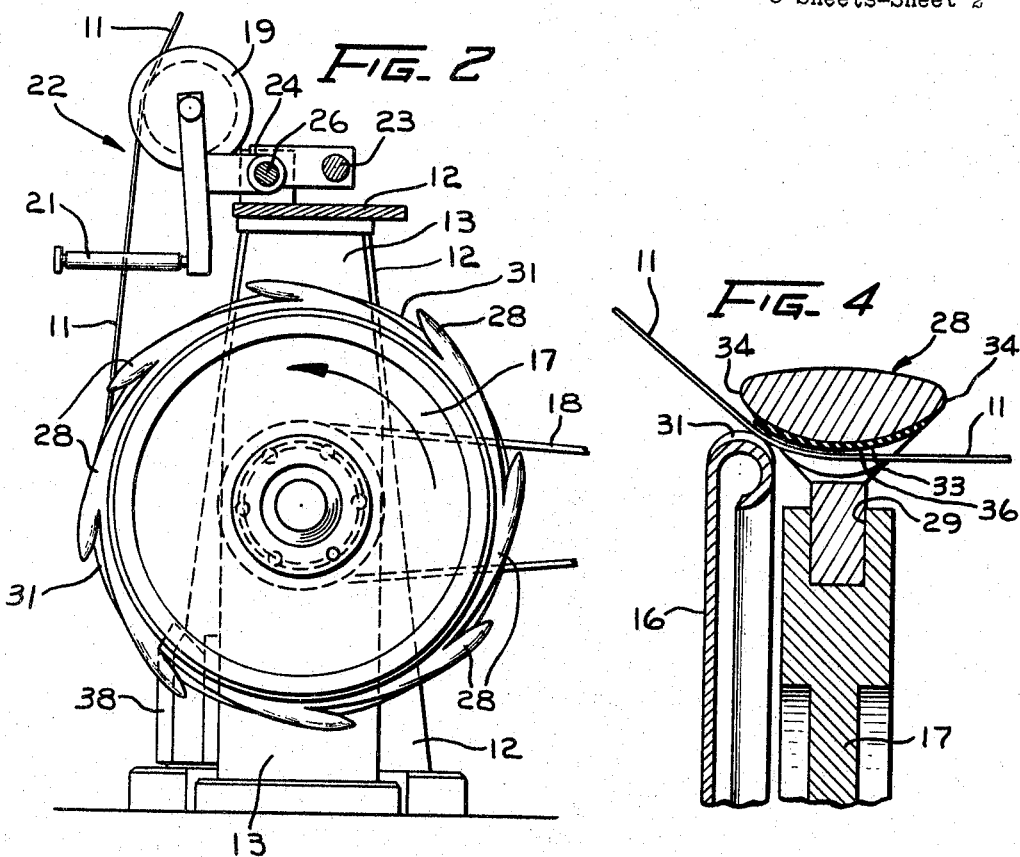
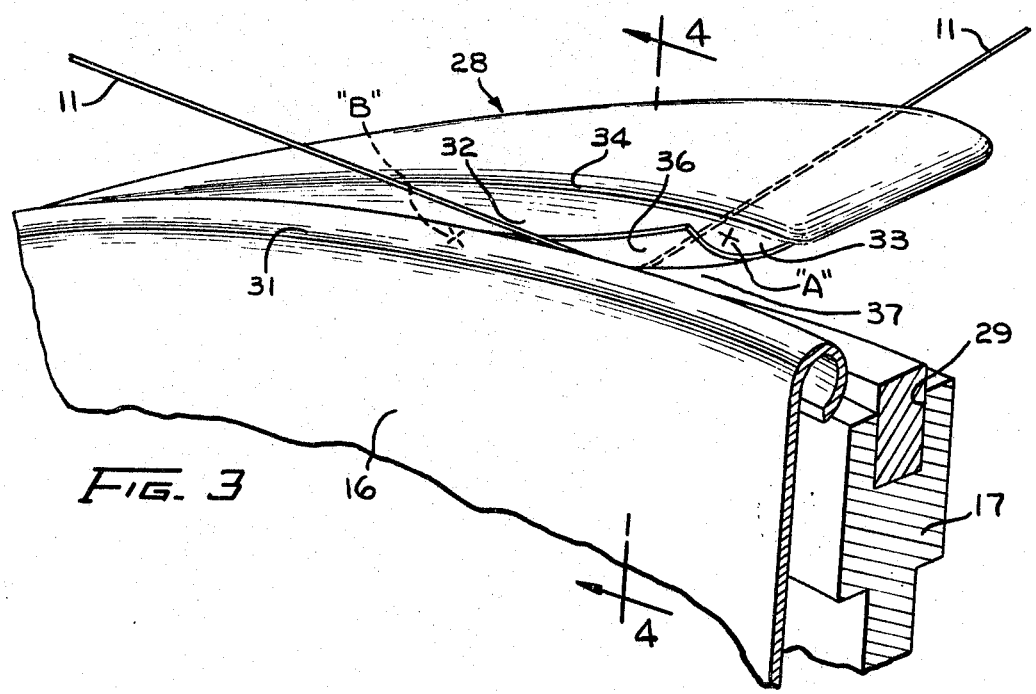

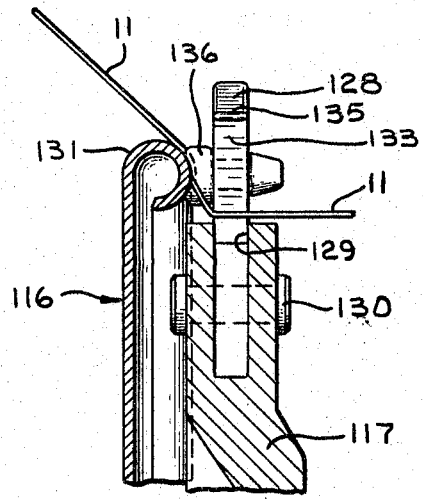
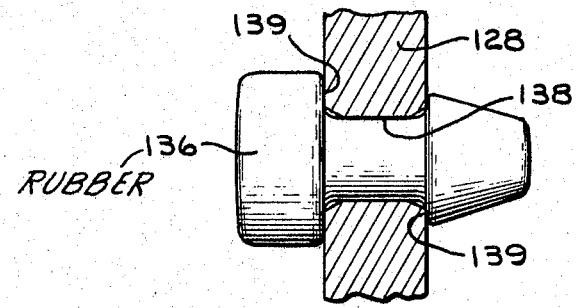
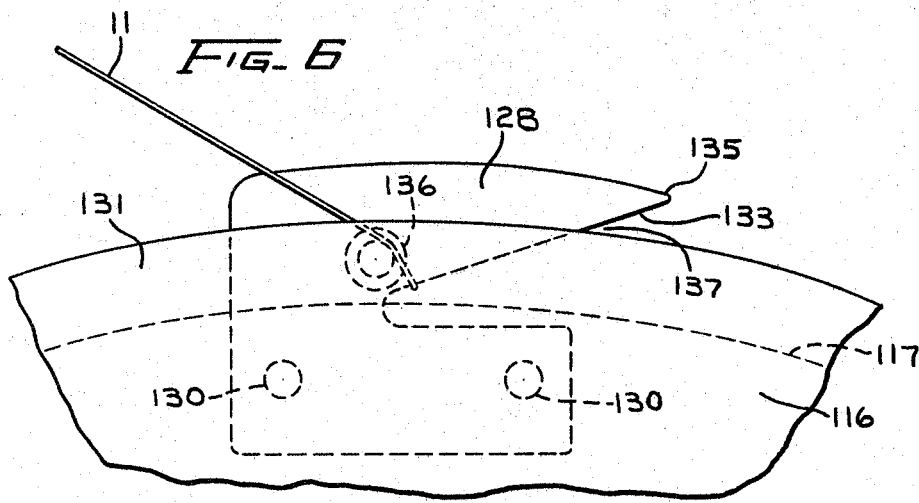

3,327,957
SNAGGER MECHANISM
James A. Trenerry, Millard, Nebr., assignor to Western Electric Company, Incorporated, a corporation of New York
Filed Sept. 17, 1965, Ser. No. 488,207
14 Claims. (Cl. 242—25)

This invention relates to strand-reeling apparatus and, more particularly, to an improved snagger mechanism for utilization therewith. It is an object of this invention to provide an improved snagger mechanism of such character.

In the manufacture of strands, such as insulated electrical conductors, it is standard practice to advance a conductor longitudinally through an extruding apparatus which extrudes insulation onto the conductor. Subsequently, the insulated conductor passes to strand-reeling apparatus in which predetermined lengths of the insulated conductor are alternately wound on rotating takeup reels in two adjacent reel positions, without interrupting the advancement of the insulated conductor.

More specifically, when a takeup reel in one reel position has been filled with the desired amount of the insulated conductor, the insulated conductor is automatically transferred to, and begins to wind upon, an empty reel in the other reel position. In this transfer operation the insulated conductor is snagged and gripped by axially spaced snagger mechanisms, each snagger mechanism being associated with a respective one of the reel positions and rotatable with the reel in that position, and as the reels and the snagger mechanisms continue to rotate the insulated conductor is cut by a knife blade mounted between the snagger mechanisms. The full reel then is stopped, snagged leading and trailing ends of the insulated conductor on the reel are removed from its associated snagger mechanism, and the reel is removed from the strand-reeling apparatus and replaced by a new empty reel.

Snagger mechanisms of prior design for such reeling apparatus have selectively introduced a number of difficulties, and generally have necessitated appreciable operator intervention in the strand-reeling operation. For example, some snagger mechanism constructions require that strand material snagged therein be pried loose by an operator to permit a full reel to be removed from the apparatus. In such instances, the snagger mechanism may be physically damaged by the operator. Other typical snagger mechanism constructions require that the operator unlock and/or uncouple some portion of the apparatus in order to remove the strand material from a snagged position.

It is therefore another object of this invention to provide an improved snagger mechanism for strand-reeling apparatus which frees a strand snagged thereby without the necessity of an operator's physical manipulation thereof.

It is still another object of this invention to provide an improved snagger mechanism which automatically frees ends of a strand snagged thereby upon release of a reel having a desired amount of strand wound thereupon.

It is a further object of this invention to provide an improved snagger mechanism which releases simultaneously both a leading and a trailing end of a strand snagged thereby when a reel having the strand wound thereupon is released from a strand-reeling apparatus.

It is a still further object of this invention to provide an improved snagger mechanism which has no moving parts associated therewith for releasing a strand snagged thereby.

It is yet a further object of this invention to provide an improved snagger mechanism which is simple to operate, efficient to use, and relatively inexpensive to construct.

In attaining these and other objects, a strand-reeling apparatus embodying certain features of the present invention may comprise a traversing distributor for guiding a strand to a takeup reel, and a snagger mechanism mounted for rotation with the reel adjacent a flange of the reel. The snagger mechanism includes a snagger tooth fixedly secured to a rotatable support member and having a compressible means, such as a member of resilient material, secured thereto and extending adjacent a portion of the reel flange. As the distributor is indexed toward and beyond the reel flange, such as when the reel becomes full, the strand is engaged in a slot defined by the snagger tooth and the peripheral edge of the reel flange and becomes secured between the resilient member and the reel flange. Thus, upon removal of the reel from the apparatus the strand is released automatically from its secured position between the reel flange and the resilient member.

Other objects and features of the invention will be more readily understood by the following detailed description when read in conjunction with the accompanying drawings, in which:

FIG. 1 is a front elevational view of a portion of a strand-reeling apparatus embodying the invention;

FIG. 2 is a sectional view taken along lines 2—2 of FIG. 1 showing a side view of a first embodiment of the improved snagger mechanism of this invention mounted in a strand-reeling apparatus;

FIG. 3 is a fragmentary, isometric view, partly in cross section, showing a portion of the first embodiment of the snagger mechanism of this invention in cooperative association with a reel flange;

FIG. 4 is a cross-sectional view, taken obliquely along line 4—4 of FIG. 3, showing a different view of the cooperative association of a portion of the first embodiment of the snagger mechanism and the reel flange;

FIG. 5 is a cross-sectional view showing in elevation an alternate embodiment of the improved snagger mechanism of this invention;

FIG. 6 is a side view of the alternate embodiment of the invention; and

FIG. 7 is an enlarged view showing in detail the resilient member used in the alternate embodiment of the invention.

Referring now to the drawings, and more particularly to FIG. 1 thereof, there is shown a strand-reeling apparatus 10 of the same general construction, and operated in a similar manner, as that disclosed in U.S. Patent 2,946,528 of T. T. Bunch, issued July 26, 1960.

The strand-reeling apparatus 10 is utilized for reeling a strand 11 without interruption upon a reel, and comprises an inverted U-shaped frame 12 and a thin, rigid support member 13 located centrally between two take-up reels 14—14. The reels 14—14 are mounted for rotation in the apparatus 10 by piston-cylinder assemblies 15—15 in such a manner that an inside reel flange 16 of each reel 14 is associated with an adjacent snagger mechanism which includes a snagger plate or disc 17. Each of the reels 14—14 and its associated snagger plate 17 is rotated independently by appropriate means (not shown) through a belt 18. The mounting and rotating mechanisms may take the form of those disclosed and described in the aforementioned patent of T. T. Bunch.

The strand 11, may for example, comprise an insulated conductor drawn at a substantially constant rate by a conventional strand-advancing capstan from a continuous extrusion apparatus (neither shown.) Thereafter, the conductor would normally pass through a conventional strand accumulator (not shown), and then pass partially around a rotatable guide sheave 19 and between a pair of spaced, parallel guide fingers 21—21 which are secured to a conventional traversing distributor 22. The extrusion apparatus, if any, strand-advancing capstan and accumulator have not been shown in the drawings as they are all of conventional design and are not directly involved in or necessary to an understanding of the present invention. The sheave 19 and the guide fingers 21—21 are moved transversely of either of the take-up reels 14—14 by the traversing distributor 22 to distribute the processed strand 11 evenly across the winding surface thereof, and to guide the strand 11 as the distributor 22 is indexed from one take-up reel 14 to the other during a cutover operation.

The traversing distributor 22 may be driven by any of many well-known means, such as a controlled piston and cylinder arrangement 23. The distributor 22 is mounted slidably, by a bearing 24, on a horizontally extending traverse rod 26 which, in turn, is supported fixedly at its ends by upright members 27—27 to the inverted U-shaped frame 12.

When one of the reels 14—14 is rotated to take up the processed strand 11, the traversing distributor 22 is moved laterally of the winding surface of that reel 14, i.e., parallel to the rotating axis thereof. Through such a movement of the distributor 22, the guide fingers 21—21 thereof distribute the processed strand 11 evenly back and forth along the winding surface of the reel 14.

In the first embodiment of the invention, a plurality of snagging teeth 28—28 (FIG. 2) are secured within a channel 29 (FIG. 3) in each of the rotating snagger plates 17. The snagging teeth 28—28 extend in their longest or lengthwise dimension from their associated snagger plate 17 both in the direction of rotation thereof and at an acute angle with respect to a peripheral edge 31 of the reel flange 16 mounted adjacent thereto.

In accordance with the principles of the invention in the first embodiment thereof, each individual snagger tooth 28, as best seen in FIGS. 3 and 4, has a main body portion 32 extending along the length thereof and a tapered and contoured under surface defined in part by the bottom 33 (FIG. 4) and in part by the curved sides 34—34, one of which is adjacent the edge 31 of the reel flange 16. The under surface of the main body portion 32 of each individual tooth 28 is tapered and contoured in such a manner that at a first leading region thereof (solid X identified by the letter A in FIG. 3), the under surface overlies the flange edge 31, and at a second region of the under surface (dotted X identified by the letter B in FIG. 3), the under surface is spaced from and below the flange edge 31.

As best seen in FIG. 3, there is secured to the tapered and contoured surface of the main body portion 32 of each individual tooth 28, a pad of resilient material 36, such as hard rubber. When the reel 14 is mounted in its proper position adjacent a snagger plate 17, an area of the resilient material 36, between the first region A and the second region B of the tapered and contoured surface of the body portion 32, is in firm engagement with a portion of the edge 31 of the reel flange 16. A tapered strand-receiving slot 37 is thereby defined between a portion of the flange edge 31 and the tapered and contoured surface of the body portion 32 from the first region A thereof to the area of engagement of the resilient material 36 secured thereto and the flange edge 31.

During a cutover operation, the traversing distributor 22 (FIG. 1) is moved from a position opposite a full reel 14 toward and beyond the snagger plate 17 associated with the full reel 14 to a position opposite an empty reel 14. In this particular cutover operation, a portion of the strand 11 is caught by an individual snagging tooth 28 secured to each of the snagger plates 17—17 mounted adjacent the inner flanges 16—16 of the two reels 14—14.

The particular portion of the strand 11 engaged by each individual snagger tooth 28, is directed by the leading edge thereof into its associated strand-receiving slot 37. In each case, as the strand 11 is drawn along a particular strand-receiving slot 37 by further joint rotation of the reels 14—14, the strand 11 comes into contact with the particular resilient pad 36 and moves therealong until finally being wedged between the resilient pad 36 and the flange edge 31. The strand 11 initially forces against the resilient pad 36 so as to compress slightly this pad, thereby allowing the strand 11 to move further along the resilient pad 36 and deeper into the strand-receiving slot 37. The strand 11 will eventually be drawn to a point whereat a portion thereof is wedged between the flange edge 31 and a section of fully compressed resilient material 36.

Once the strand 11 is secured in and between individual strand-receiving slots 37 defined by the snagger mechanisms and the adjacent associated reels 14—14, further rotation of the reels will carry the gripped portion of the strand 11 extending between the reels 14—14 into engagement with a conventional knife edge 38 (FIG. 1). The knife edge 38 severs the strand 11 because the strand is rotated into engagement with the knife edge at a time when portions of the strand are being securely gripped on opposite sides of the knife edge.

Thereafter, strand material 11 is wound onto the reel 14 to which the traversing distributor 22 has been indexed. Simultaneous with the winding of strand material 11 onto the new reel 14, the full reel of strand is slowed down, stopped and removed from the strand-reeling apparatus. As the full reel 14 is removed from the strand-reeling apparatus, the end of the strand 11, previously securely held between the resilient pad 36 and the edge 31 of the reel flange 16, is released, as the operable contact of the reel flange 16 and the snagger tooth 28 is destroyed. Thus, the release of a snagged strand 11 is automatic with the release of a full reel 14 from the strand-reeling apparatus.

Referring now to FIGS. 5, 6 and 7, an alternate embodiment of the improved snagger mechanism of this invention is depicted therein. In the alternate embodiment, a snagger plate 117 has secured in a channel portion 129 thereof a plurality of snagging teeth 128 (only one shown), the teeth being secured by means of rivets 130—130.

Each individual snagging tooth 128 has a leading portion 135 thereof (best seen in FIG. 6) which extends above the peripheral edge 131 of its associated, adjacent flange 116 of a reel. A strand receiving slot 137, defined between the flange edge 131 and the leading portion 135 of the snagging tooth 128, extends along a bottom surface 133 of the tooth.

A compressible member 136, constructed of a material such as hard rubber, is received in an opening 138 of the tooth 128 and retained therein by flanged portions 139 of the member 136. The compressible member is located at a position spaced from and behind the leading portion 135 of the tooth 128. The member 136 extends from the tooth toward and into firm engagement with an outer portion of the flange edge 131 associated with the snagger tooth.

Upon transfer of strand distribution from a full reel 14 to an empty reel as aforedescribed, the strand 11 is received within the strand-receiving slot 137 and drawn along the under surface 133 of the tooth 128. Ultimately the strand 11 comes into engagement with the compressible member 136 and is drawn between the member and the flange edge 131. Since the member 136 is in firm engagement with the flange edge 131, the strand 11, once received therebetween, is held in a secured position.

Upon release of the filled reel 14, the flange edge 131 is drawn out of engagement with the compressible member 136 and the strand 11 entrapped therebetween is released.

The improved snagger mechanism of this invention also may be utilized with a strand-reeling apparatus wherein only a single reel is utilized with an associated snagger mechanism. Further, the snagger mechanism may be utilized with reels having flanges with other than a circular configuration so long as the snagger tooth projects from its associated support member in both the direction of rotation of its support member and at an acute angle with respect to a peripheral edge portion of the flange mounted adjacent the tooth.

The compressible material utilized in the aforegoing disclosure may also be replaced by other compressible means such as a surface having a spring loaded portion therealong which functions in a manner analogous to the resilient pad.

There h as been disclosed herein a snagger mechanism for use in conjunction with strand-reeling apparatus. The snagger mechanism is designed in such a manner that a strand snagged thereby is freed without necessity of an operator's physical manipulation thereof. Further, the snagging mechanism has no moving parts, is simple in operation, efficient in use, and relatively inexpensive to construct.

It is to be understood that the above-described arrangements are simply illustrative of the application of the principles of this invention. Other arrangements may be devised by those skilled in the art which embody the principles of this invention and fall within the spirit and scope thereof.

What is claimed is:

1. In combination with strand-reeling apparatus of the type including mechanism for mounting and axially rotating a take-up reel and a traversing distributor for guiding a strand to the reel, the distributor being indexable from a position opposite the mounted reel to a position toward and beyond a flange of the reel; an improved snagger mechanism mounted for rotation adjacent the reel flange which comprises:
   a rotatable support member;
   a snagger tooth secured to said support member and extending outwardly therefrom in the direction of rotation of said support member and at an acute angle with respect to the peripheral edge of the reel flange mounted adjacent thereto, said snagger tooth having a tapered surface defined in part by the bottom of said tooth and in part by the side of said tooth adjacent the reel flange, said surface being tapered such that in a first region thereof said surface projects above the peripheral edge of the flange, and in a second region thereof said surface is spaced from and below the peripheral edge of the flange; and
   compressible means secured to said tapered surface at least between the first and second regions thereof, said compressible means tapering toward and finally firmly engaging a portion of the peripheral edge of the flange of the mounted reel such that a tapered strand-receiving slot is defined therebetween;
   whereby upon indexing of the distributor from a position opposite the mounted reel to a position toward and beyond the reel flange adjacent the snagger mechanism, the strand is engaged by said strand-receiving slot and directed into a secured position between said compressible means and the reel flange, and whereby upon release of the reel from the strand-reeling apparatus the strand is released from its secured position.

2. The combination containing the improved snagger mechanism as defined in claim 1 wherein said compressible means comprises a pad of resilient material.

3. In combination with strand-reeling apparatus of the type including mechanism for mounting and axially rotating a take-up reel and a traversing distributor for guiding a strand to the reel, the distributor being indexable from a position opposite the mounted reel to a position toward and beyond a flange of the reel; an improved snagger mechanism mounted for rotation adjacent the reel flange which comprises:
   a rotatable support member;
   a plurality of snagger teeth secured to the outer edge of said suport member in spaced relationship, with each of said teeth extending outwardly therefrom in the direction of rotation of said support member and at an acute angle with respect to the peripheral edge of the reel flange mounted adjacent thereto, each individual snagger tooth having a tapered surface defined in part by the bottom of said tooth and in part by the side of said tooth adjacent the reel flange, said surface being tapered such that in a first region thereof said surface projects above the peripheral edge of the flange, and in a second region thereof said surface is spaced from and below the peripheral edge of the flange; and
   compressible means secured to said tapered surface at least between the first and second regions thereof, said compressible means tapering toward and finally firmly engaging a portion of the peripheral edge of the flange of the mounted reel such that a tapered strand-receiving slot is defined therebetween;
   whereby upon indexing of the distributor from a position opposite the mounted reel to a position toward and beyond the reel flange adjacent the snagger mechanism, the strand is engaged by one of said strand-receiving slots and directed into a secured position between said compressible means and the edge of the reel flange which in part define said one strand-receiving slot, and whereby upon release of the reel from the strand-reeling apparatus the strand is released from its secured position.

4. The combination containing the improved snagger mechanism as defined in claim 3 wherein said compressible means comprises a pad of resilient material.

5. In combination with a strand-reeling apparatus of the type including mechanism for mounting and axially rotating a pair of spaced take-up reels, a traversing distributor for guiding a strand to either reel, the distributor being indexable from a position opposite a full reel to a position opposite an empty reel when it is desired to cut over between reels, and a cutter mounted between the reels so as to sever the strand which extends between the reels upon indexing of the distributor; a pair of improved snagger mechanisms mounted for rotation adjacent the mutually opposed, inner flanges of the reels, respectively, each of which snagger mechanisms comprises:
   a rotatable support disk;
   a plurality of snagger teeth secured to the outer rim of said support disk in spaced relationship, with each of said teeth extending outwardly therefrom in the direction of rotation of said support disk and at an acute angle with respect to the circumferential edge of the reel flange mounted adjacent thereto, each individual snagger tooth having a tapered surface defined in part by the bottom of said tooth and in part by the side of said tooth adjacent the reel flange, said surface being tapered such that in a first region thereof said surface projects above the circumferential edge of the reel flange, and in a second region thereof said surface is spaced from and below the circumferential edge of the reel flange; and
   compressible means secured to said tapered surface and having an area thereof between the first and second regions of said tapered surface firmly engageable with a portion of the circumferential edge of the flange of the mounted reel such that a tapered strand-receiving slot is defined between a portion of the circumferential edge of the reel flange and said tapered surface from its first region to the point of engagement of said compressible means and the reel flange;
   whereby upon indexing of the distributor from a position opposite a full reel to a position opposite an empty reel, the strand is engaged by one of said strand-receiving slots in each of the snagger mechanisms and directed into a secured position between said compressible means and the circumferential edge of the reel flange which in part define said one strand-receiving slot in each snagger mechanism such that the strand is securely held at points spaced on opposite sides of the cutter and is severed by the cutter upon further rotation of the reels, and whereby upon release of the full reel from the strand-reeling apparatus the strand secured between the edge of the full reel and its associated snagger mechanism is released from its secured position.

6. The combination containing the improved snagger mechanism as defined in claim 5 wherein:

said tapered surface of each individual snagger tooth is defined both in part by the bottom of said tooth and in part by both sides of said tooth; and wherein:

said compressible means secured to said tapered surface comprises a resilient pad which covers at least the major portion of both sides and the bottom of said tooth defining said surface;

whereby the improved snagger mechanism may be mounted for rotation adjacent the inner flange of either reel to form a plurality of strand-receiving slots therewith.

7. In combination with strand-reeling apparatus of the type including mechanism for mounting and axially rotating a take-up reel and a traversing distributor for guiding a strand to the reel, the distributor being indexable from a position opposite the mounted reel to a position toward and beyond a flange of the reel; an improved snagner mechanism mounted for rotation adjacent the reel flange which comprises:

a rotatable support member;

a snagger tooth secured to said support member and extending outwardly therefrom in the direction of rotation of said support member and at an acute angle with respect to the peripheral edge of the reel flange mounted adjacent thereto, said snagger tooth having a leading portion which terminates in a region above the peripheral edge of the reel flange and a surface extending rearwardly and downwardly from said leading portion to a region below the peripheral edge of the reel flange such that a strand-receiving slot is defined between said tooth and the reel flange; and compressible means secured to said snagger tooth at a position spaced from and behind said strand-receiving slot and juxtaposed with the peripheral edge of the reel flange adjacent thereto, said compressible means extending from said tooth into firm engagement with a portion of the edge of the adjacent reel flange;

whereby upon indexing of the distributor from a position opposite the mounted reel to a position toward and beyond the reel flange adjacent the snagger mechanism, the strand is engaged by said strand-receiving slot and directed into a secured position between said compressible means and the reel flange, and whereby upon release of the reel from the strand-reeling apparatus the strand is released from its secured position.

8. The combination containing the improved snagger mechanism as defined in claim 7 wherein said compressible means comprises a pad of resilient material.

9. In combination with strand-reeling apparatus of the type including mechansim for mounting and axially rotating a take-up reel and a traversing distributor for guiding a strand to the reel, the distributor being indexable from a position opposite the mounted reel to a position toward and beyond a flange of the reel; an improved snagger mechanism mounted for rotation adjacent the reel flange which comprises:

a rotatable support member;

a plurality of snagger teeth secured to the outer edge of said support member in spaced relationship, with each of said teeth extending outwardly therefrom in the direction of rotation of said support member and at an acute angle with respect to the peripheral edge of the reel flange mounted adjacent thereto, each individual snagger tooth having a leading portion which terminates in a region above the peripheral edge of the reel flange and a surface extending rearwardly and downwardly from said leading portion to a region below the peripheral edge of the reel flange such that a strand-receiving slot is defined between said tooth and the reel flange; and compressible means secured to said snagger tooth at a position spaced from and behind said strand-receiving slot and juxtaposed with the peripheral edge of the reel flange adjacent thereto, said compressible means extending from said tooth into firm engagement with a portion of the edge of the adjacent reel flange;

whereby upon indexing of the distributor from a position opposite the mounted reel to a position toward and beyond the reel flange adjacent the snagger mechanism, the strand is engaged by one of said strand-receiving slots and directed into a secured position between said compressible means and the edge of the reel flange which in part defines said one strand-receiving slot, and whereby upon release of the reel from the strand-reeling apparatus the strand is released from its secured position.

10. The combination containing the improved snagger mechanism as defined in claim 9 wherein said compressible means comprises a pad of resilient material.

11. In combination with a strand-reeling apparatus of the type including mechanism for mounting and axially rotating a pair of spaced take-up reels, a traversing distributor for guiding a strand to either reel, the distributor being indexable from a position opposite a full reel to a position opposite an empty reel when it is desired to cut over between reels, and a cutter mounted between the reels so as to sever the strand which extends between the reels upon indexing of the distributor; a pair of improved snagger mechanisms mounted for rotation adjacent the mutually opposed, inner flanges of the reels, respectively, each of which snagger plates comprises:

a rotatable support disk;

a plurality of snagger teeth secured to the outer rim of said support disk in spaced relationship, with each of said teeth extending outwardly therefrom in the direction of rotation of said support disk and at an acuate angle with respect to the circumferential edge of the reel flange mounted adjacent thereto, each individual snagger tooth having a leading portion which terminates in a region above the edge of the reel flange and a surface extending rearwardly and downwardly from said leading portion to a region below the circumferential edge of the reel flange such that a strand-receiving slot is defined between said tooth and the reel flange; and compressible means secured to said snagger tooth at a position spaced from and behind said strand-receiving slot and juxtaposed with the circumferential edge of the reel flange adjacent thereto, said compressible means extending from said tooth into firm engagement with a portion of the edge of the adjacent reel flange;

whereby upon indexing of the distributor from a position opposite to a full reel to a position opposite to an empty reel, the strand is engaged by one of said strand-receiving slots in each of the snagger mechanisms and directed into a secured position between said compressible means and the circumferential edge of the flange of each associated reel such that the strand is securely held at points spaced on opposite sides of the cutter and is severed by the cutter upon further rotation of the reels, and whereby upon release of the full reel from the strand-reeling apparatus the strand secured between the edge of the full reel and its associated snagger plate is released from its secured position.

12. The combination containing the improved snagner mechanism as defined in claim 11 wherein:

said compressible means secured to said snagger tooth comprises a resilient plug that extends from said snagger tooth on both sides thereof whereby the improved snagger mechanism may be mounted for rotation adjacent the inner flange of either reel to form a strand-receiving slot therewith.

13. In combination with strand-reeling apparatus of the type including mechanism for mounting and axially rotating a flanged take-up reel and a traversing distributor for guiding a strand to the reel, the distributor being indexable from a position opposite a point spaced from one side of a flange of the mounted reel to a position toward and beyond an opposite side of the reel flange; an improved rotatable snagger mechanism adjacent which the reel flange is located, which comprises:

a rotatable support member;

a snagger tooth fixedly secured to said support member and extending outwardly therefrom in the direction of rotation of said support member and at an acute angle with respect to the peripheral edge of the reel flange, the leading portion of said tooth terminating in a region outward with respect to the peripheral edge of the reel flange such that said tooth and the peripheral edge define a slot for receiving the strand upon indexing of the distributor toward and beyond the reel flange; and a member of resilient material mounted on said snagger tooth at a position spaced from and behind the leading portion thereof and extending from said tooth toward and adjacent to a portion of the reel flange adjacent said snagger tooth such that when the strand is received in the strand-receiving slot upon indexing of the distributor toward and beyond the reel flange the strand becomes secured between said member of resilient material and the reel flange;

whereby the strand is automatically released from its secured position between said member of resilient material and the reel flange upon removal of the reel from the strand-reeling apparatus.

14. The combination containing the improved snagger mechanism as defined in claim 13 wherein:

said snagger tooth extends from said support member such that the snagger mechanism and a flange of a reel can be located adjacent one another with said tooth and the peripheral edge of the reel flange defining a strand-receiving slot regardless of on which of two opposite sides of the snagger mechanism the reel flange is located; and wherein:

said member of resilient material extends from opposite sides of said snagger tooth such that said member cooperates with a portion of the reel flange to secure the strand when it is received in the slot upon indexing of the distributor toward and beyond the reel flange.

References Cited
UNITED STATES PATENTS

| | | | |
|---|---|---|---|
| 2,930,537 | 3/1960 | Davis et al. | 242—25 |
| 2,946,527 | 7/1960 | Ellis | 242—25 |
| 2,971,713 | 2/1961 | Henning | 242—25 |

FRANK J. COHEN, *Primary Examiner.*

N. L. MINTZ, *Assistant Examiner.*